UNITED STATES PATENT OFFICE.

WICKHAM B. SPEAR AND JOSEPH W. RICHARDS, OF PHILADELPHIA, PA.

IMPROVEMENT IN PROCESSES OF PURIFYING GALVANIZERS' DROSS.

Specification forming part of Letters Patent No. 161,831, dated April 6, 1875; application filed March 23, 1875.

*To all whom it may concern:*

Be it known that we, WICKHAM B. SPEAR and JOSEPH W. RICHARDS, both of the city and county of Philadelphia, in the State of Pennsylvania, have invented a certain new and useful Process for Purifying Galvanizers, Dross, &c., of which the following is a specification:

The object of our invention is to provide suitable means for separating zinc from iron or other impurities with which it may be contaminated, and specially to afford convenient and desirable means for the purification of what is technically known as "galvanizers' dross." To which ends our improvement consists in the application of sulphur or sulphurous-acid gas to the material to be purified while the latter is in a state of fusion, as hereinafter more fully set forth.

In the process of galvanizing iron—that is to say, coating it with zinc—the iron is immersed in a bath of melted zinc, which, after the operation has been repeated, is found to contain a certain proportion of impurities, consisting of oxide or chloride of iron and an alloy or compound of zinc and iron, with small proportions of lead, tin, and antimony, said compound being termed "galvanizers' dross," and being, moreover, of greater specific gravity than pure zinc.

The iron taken up by the zinc, from its affinity for the latter, is, if in small particles, at once absorbed, while large pieces are partially dissolved, and, if allowed to remain in the bath, will ultimately become entirely alloyed with zinc. The alloy, which is, as before stated, of greater specific gravity than zinc, is of a very brittle nature, so that, if the iron is present in large quantity, it becomes granular, and, as it accumulates, requires to be removed, from time to time, from beneath the surface of the pure melted zinc, which removal is effected by the use of a perforated spoon, spade, or other suitable implement.

An average sample of galvanizers' dross is found to contain, say, ninety-two per cent. of zinc, six per cent. of iron, and small percentages of lead, tin, and antimony. It will, therefore, be obvious that the recovery or separation of so large a proportion of zinc involves a considerable pecuniary saving, and we have found, by practical experience, that our invention effects this object readily and satisfactorily.

In carrying out our invention we take the ordinary galvanizers' dross, the composition of which is substantially as hereinbefore stated, and expose it to high heat—say, a little above 900° Fahrenheit—in a suitable vessel or furnace, preferring a furnace of sufficient capacity for the treatment of from five to ten thousand pounds of material at a time, and of such form as that the melted material shall be not less than about one foot in depth. When the percentage of iron is small the compound becomes liquid at about 900° Fahrenheit, but when the dross contains a large percentage of iron it assumes a thick pasty consistency, and upon the application of higher heat the zinc rapidly oxidizes and burns with a blue flame. In such instances, therefore, as the dross contains a large percentage of iron, we add slab or scrap zinc until the mass assumes a perfectly liquid state, in order to obviate the tendency to oxidation just mentioned.

In order to separate the zinc from the iron and other impurities with which it is alloyed, we add sulphur or a current of sulphurous-acid gas, for a short period of time, to the liquid mass in the melting vessel or furnace, the resultant action being that the sulphur combines with the iron, forming sulphide of iron, particles of which, in a finely-divided state, float upon the top of the mass, the larger portion, however, subsiding to the bottom of the furnace or melting-vessel, while the pure separated zinc remains between the two portions of separated impurities, and may be drawn off by tapping, if the operation is conducted in a furnace, or by ladling, if in a vessel or kettle.

The sulphur may be applied to the melted dross in either of two ways, as may be found most convenient and desirable. The method which we find, in practice, to be preferable is to introduce a quantity of ordinary sulphur at the bottom of the melted mass, by means of a hollow metallic tube, an inverted long-handled ladle, or any other device suitable for the purpose. The heat of the melted dross changes the sulphur from the solid to the gaseous state, and the oxygen of the oxide of zinc combines with the sulphur, assisting combustion, while the rapid evolution of sulphurous-acid gas agitates the whole mass and subjects all portions thereof to the action of the gas.

If preferred, sulphurous-acid gas may be generated by burning commercial sulphur in a separate vessel and forcing the gas through a tube to the bottom of the melted mass; but the first-described plan will be found, in our judgment, to be a more practical and satisfactory one.

In our own practice we have found that a period of from five to ten minutes is generally sufficient for the purification of a charge of dross of, say, three thousand five hundred pounds, employing for the purpose about thirty pounds of sulphur, the quantity of sulphur being varied according to the degree of impurity of the dross.

Our improvement may also be applied in a similar manner to the purification of zinc in the ordinary galvanizer's bath, in which case we find that, by the addition of sulphur once or twice a day, as may be necessary, the amount of dross produced weekly in the ordinary sheet-iron galvanizer's bath, is reduced from about three thousand pounds to an average of only one-tenth that amount.

We claim as our invention—

The improvement in the art of separating zinc from an alloy of iron and other impurities, consisting in the application of sulphur or sulphurous-acid gas to the alloy while the latter is in a state of fusion, substantially as set forth.

W. B. SPEAR.
JOSEPH W. RICHARDS.

Witnesses:
E. L. PERKINS,
J. SNOWDEN BELL.